US011503506B2

(12) United States Patent
Morita et al.

(10) Patent No.: US 11,503,506 B2
(45) Date of Patent: Nov. 15, 2022

(54) BASE STATION DEVICE, WIRELESS COMMUNICATION CONTROL METHOD, AND RECORDING MEDIUM HAVING BASE STATION CONTROL PROGRAM STORED THEREIN

(71) Applicant: NEC Corporation, Tokyo (JP)

(72) Inventors: Motoki Morita, Tokyo (JP); Takahiro Nobukiyo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 808 days.

(21) Appl. No.: 16/330,626

(22) PCT Filed: Sep. 1, 2017

(86) PCT No.: PCT/JP2017/031610
§ 371 (c)(1),
(2) Date: Mar. 5, 2019

(87) PCT Pub. No.: WO2018/047738
PCT Pub. Date: Mar. 15, 2018

(65) Prior Publication Data
US 2021/0297903 A1 Sep. 23, 2021

(30) Foreign Application Priority Data
Sep. 8, 2016 (JP) .............................. JP2016-175566

(51) Int. Cl.
*H04W 28/22* (2009.01)
*H04W 72/08* (2009.01)

(52) U.S. Cl.
CPC ........... *H04W 28/22* (2013.01); *H04W 72/08* (2013.01)

(58) Field of Classification Search
CPC ....... H04W 28/22; H04W 72/08; H04W 4/00; H04W 72/1221
See application file for complete search history.

(56) References Cited

U.S. PATENT DOCUMENTS

| 5,623,483 A * | 4/1997 | Agrawal | ............... | H04J 3/0632 |
| | | | | 370/253 |
| 6,751,194 B1 * | 6/2004 | Ueno | ...................... | H04J 3/247 |
| | | | | 370/235 |
| 6,920,148 B1 * | 7/2005 | Kato | .................. | H04Q 11/0478 |
| | | | | 370/337 |

(Continued)

FOREIGN PATENT DOCUMENTS

| JP | 2012-195771 A | 10/2012 |
| JP | 2014-045267 A | 3/2014 |

(Continued)

OTHER PUBLICATIONS

International Search Report for PCT/JP2017/031610 dated Nov. 21, 2017 [PCT/ISA/210].

(Continued)

*Primary Examiner* — Ivan O Latorre
(74) *Attorney, Agent, or Firm* — Sughrue Mion, PLLC

(57) ABSTRACT

The present invention enhances the quality that a user feels in a wireless communication system. This base station device 60 is provided with: a calculation unit 63 which calculates a data transmission start deadline at which data transmission to a wireless terminal device 70 can be completed by a completion deadline for transmission to the wireless terminal device 70 set on the basis of information about the application, when the data, which is transmitted to the wireless terminal device 70 by the application executed by a server device 80 in response to a request from the wireless terminal device 70, is transmitted to the wireless terminal device 70 by using a wireless resource; and an allocation unit 64 which allocates a wireless resource necessary for the transmission of the corresponding data to the wireless terminal device 70 on the basis of the transmission start deadline and the current time.

11 Claims, 7 Drawing Sheets

(56) References Cited

U.S. PATENT DOCUMENTS

| | | | |
|---|---|---|---|
| 7,633,880 B2* | 12/2009 | Bang | H04L 47/32 370/252 |
| 7,889,653 B2* | 2/2011 | Grob-Lipski | H04L 65/80 370/230.1 |
| 2002/0054578 A1* | 5/2002 | Zhang | H04L 1/0001 370/328 |
| 2003/0223429 A1* | 12/2003 | Bi | H04L 47/50 370/395.4 |
| 2004/0165543 A1* | 8/2004 | Nakazawa | H04L 47/14 370/252 |
| 2004/0196801 A1* | 10/2004 | Hiramatsu | H04L 1/1812 370/328 |
| 2006/0133325 A1* | 6/2006 | Harris | H04W 72/04 370/336 |
| 2007/0280168 A1* | 12/2007 | Shibata | H04L 1/0026 370/331 |
| 2010/0202418 A1* | 8/2010 | Barrett | H04W 72/1221 370/336 |
| 2010/0215008 A1* | 8/2010 | Wang | H04W 72/10 370/329 |
| 2013/0155955 A1* | 6/2013 | Nabetani | H04W 74/0816 370/328 |
| 2014/0233456 A1* | 8/2014 | Kodama | H04L 1/188 370/328 |
| 2015/0109942 A1* | 4/2015 | Nguyen | H04L 43/12 370/252 |
| 2015/0124671 A1* | 5/2015 | Tabet | H04L 1/1887 370/311 |
| 2015/0245358 A1* | 8/2015 | Schmidt | H04L 43/0888 370/329 |
| 2016/0198364 A1* | 7/2016 | Schwarzbauer | H04W 28/08 370/331 |
| 2018/0026902 A1* | 1/2018 | Tang | H04L 49/9047 370/392 |
| 2019/0020443 A1* | 1/2019 | Ohkawa | H04L 69/22 |

FOREIGN PATENT DOCUMENTS

| | | | | |
|---|---|---|---|---|
| WO | 2005/032075 A1 | 4/2005 | | |
| WO | WO-2015066881 A | * 5/2015 | | H04W 72/12 |

OTHER PUBLICATIONS

Written Opinion for PCT/JP2017/031610 dated Nov. 21, 2017 [PCT/ISA/237].

* cited by examiner

BASE STATION DEVICE, WIRELESS COMMUNICATION CONTROL METHOD, AND RECORDING MEDIUM HAVING BASE STATION CONTROL PROGRAM STORED THEREIN

CROSS REFERENCE TO RELATED APPLICATIONS

This application is a National Stage of International Application No. PCT/JP2017/031610 filed Sep. 1, 2017, claiming priority based on Japanese Patent Application No. 2016-175566 filed Sep. 8, 2016, the disclosure of which is incorporated herein in its entirety.

TECHNICAL FIELD

The present invention relates to a technique for allocating a wireless resource in order to perform communication with a wireless terminal device in a base station device and the like of wireless communication.

BACKGROUND ART

In recent years, with popularization of smartphones and tablet terminals, data traffic of mobile communication is rapidly increasing. In addition, applications of mobile communication, such as browsing of Web pages, viewing of large-capacity videos, social networking service (SNS), and Voice over Internet Protocol (IP) (VoIP), have diversified, and not only an amount of traffic but also quality thereof have changed.

On the other hand, as an index that affects a value of a network, attention has been recently paid to quality of experience (QoE) representing quality of user experience. Quality of service (QoS) representing quality of a service provided by a network represents a scale of service quality such as a packet loss, a delay of a packet, and a fluctuation of an arrival time of a packet, viewed from a communication carrier or a service provider. In contrast, QoE represents a scale of service quality of an application such as an interruption time of a video and a download time of the Web, viewed from a user. In such a manner, while traffic changes quantitatively and qualitatively in mobile communication, expectation for a technique for maintaining or improving QoE by flexibly allocating a wireless resource to a user is increasing.

As a technique relating to such a technique, PTL 1 discloses a communication device that executes scheduling of data transmission for data in a transmission-waiting state existing in a plurality of data storage units. A request occurrence time providing unit in the communication device provides a reception time for received data and sequentially stores the reception time-provided data on the data storage unit. Then, a scheduling unit in the communication device acquires a reception time of the oldest data (transmission candidate data) among data in a transmission-waiting state, for each data storage unit, and adds a previously-provided allowable delay time for each piece of transmission candidate data, to a reception time acquired for the each data storage unit. Thereby, the communication device calculates a transmission completion time of each piece of transmission candidate data and allocates a wireless resource to "transmission candidate data (transmission target data) having the smallest time margin by a transmission completion time" determined based on the calculation result.

Further, PTL2 discloses a communication control device that executes transmission control of data in which a transmission completion time is considered when pieces of data to be transmitted to a plurality of wireless communication devices exist at the same time. The communication control device determines a plurality of candidates for a transmission start time for transmitting data to a plurality of wireless communication devices. The communication control device calculates, for the plurality of candidates, an end time of data transmission when each data transmission starts. The communication control device then determines a transmission start time for transmitting data to a plurality of wireless communication devices 5, by using an optimization problem in which a function of an end time is an objective function.

CITATION LIST

Patent Literature

[PTL 1] International Publication No. WO 2005/032075
[PTL 2] Japanese Unexamined Patent Application Publication No. 2014-45267

SUMMARY OF INVENTION

Technical Problem

In general, as a load on a communication network becomes higher, a ratio of users difficult to satisfy predetermined QoE tends to increase. Herein, it is assumed that the predetermined QoE is quality that is a criterion for continuously using an application by a user. It is assumed that when, for example, in a wireless terminal device, by a request value of a time necessary for competing reception of data configuring a Web page to be browsed, the reception of the data is completed, predetermined QoE is satisfied.

In a base station device and the like in a wireless communication system, a general scheduler for allocating a wireless resource for performing communication with a wireless terminal device allocates a wireless resource on the basis of signal quality of wireless communication. In this case, a general scheduler does not allocate a wireless resource by considering a transmission completion time that satisfies predetermined QoE, and therefore it is difficult to solve a problem that a ratio of users difficult to satisfy predetermined QoE increases. PTL 1 and 2 do not disclose a technique for flexibly allocating a wireless resource in such a way as to be able to solve this problem. A main object of the present invention is to provide a wireless communication control system and the like that solve this problem.

Solution to Problem

A base station device according to one aspect of the present invention includes: when the data, which are transmitted to a wireless terminal device by an application executed by a server device in response to a request from the wireless terminal device, are transmitted to the wireless terminal device by using a wireless resource, a calculation means that calculates a transmission start deadline of data that enables to complete transmission of the data to the wireless terminal device by a transmission end deadline for the wireless terminal device, the transmission end deadline being set on the basis of information about the application; and an allocation means that allocates the wireless resource necessary for transmitting the data to the wireless terminal device on the basis of the transmission start deadline and a current time.

In another viewpoint of achieving the object, a wireless communication control method according to one aspect of the present invention controls a base station device to: set, by a first information processing device, a transmission end deadline for a wireless terminal device on the basis of information about an application executed by a server device in response to a request from the wireless terminal device, when data transmitted to the wireless terminal device by the application are transmitted to the wireless terminal device by using a wireless resource; calculate, by a second information processing device, a transmission start deadline of the data in such a way that transmission of the data to the wireless terminal device is able to be completed by the transmission end deadline; and allocate, by a third information processing device, the wireless resource necessary for transmitting the data to the wireless terminal device on the basis of the transmission start deadline and a current time.

Further, in yet another viewpoint of achieving the object, a base station control program according to one aspect of the present invention is a program for causing a computer to execute: when the data, which are transmitted to a wireless terminal device by an application executed by a server device in response to a request from the wireless terminal device, are transmitted to the wireless terminal device by using a wireless resource, calculation processing of calculating a transmission start deadline of data that enables to complete transmission of the data to the wireless terminal device by a transmission end deadline for the wireless terminal device, the transmission end deadline being set on the basis of information about the application; and allocation processing of allocating the wireless resource necessary for transmitting the data to the wireless terminal device on the basis of the transmission start deadline and a current time.

Further, the present invention can be also achieved by a computer-readable non-transitory recording medium storing the base station control program (computer program).

Advantageous Effects of Invention

The present invention is able to improve quality of user experience in wireless communication.

EXAMPLE EMBODIMENT

Hereinafter, example embodiments of the present invention are described in detail with reference to the drawings.

First Example Embodiment

Figure 1:
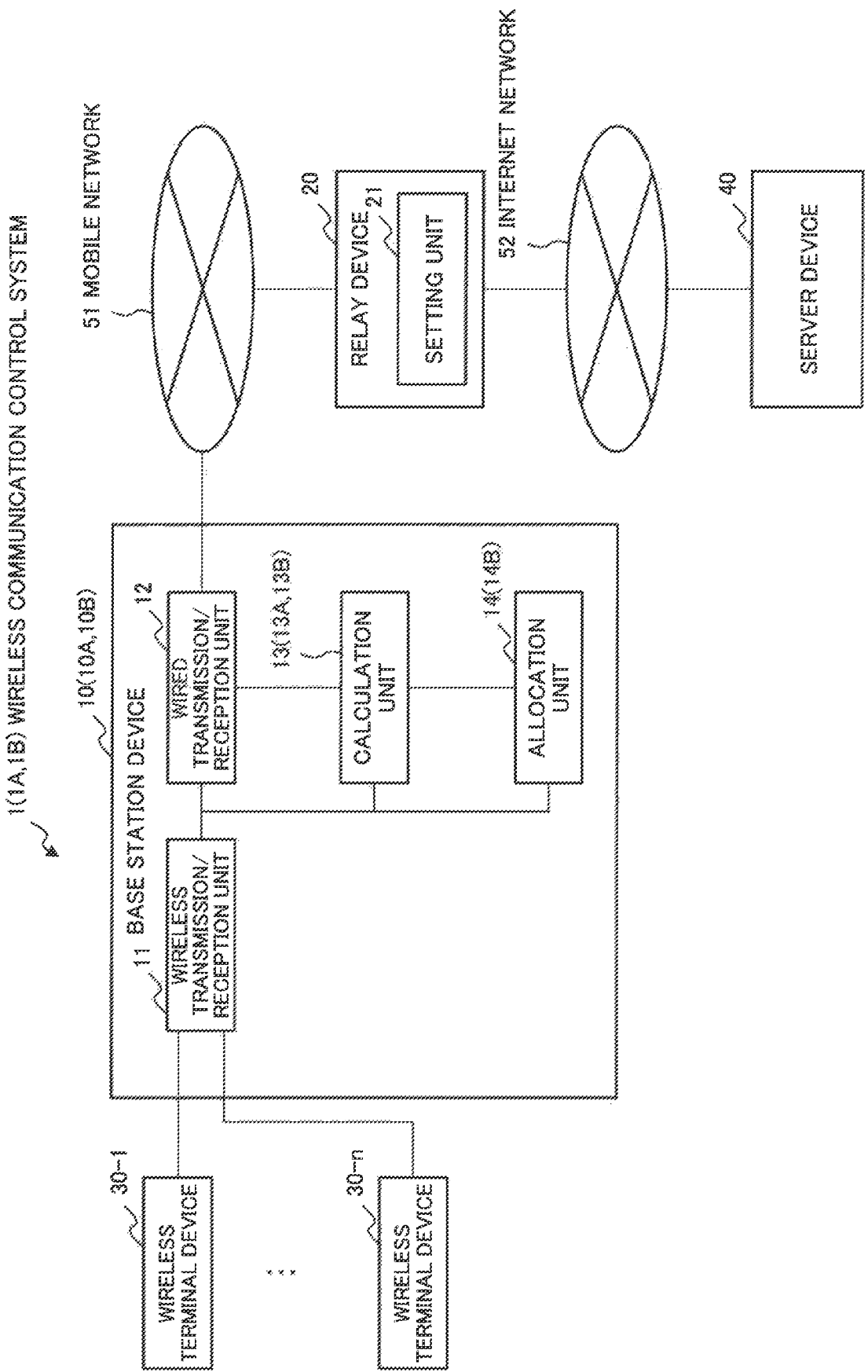
FIG. 1 is a block diagram illustrating a configuration of a wireless communication control system 1 according to a first example embodiment of the present invention.

FIG. 1 is a block diagram conceptually illustrating a configuration of a wireless communication control system 1 according to a first example embodiment of the present invention. Note that, in wireless communication control systems 1A and 1B according to second and third example embodiments to be described later, merely a configuration of at least either one of a "calculation unit" or an "allocation unit" is different from the present example embodiment, and therefore for convenience of description, also in these example embodiments, FIG. 1 is referred to again. The wireless communication control system 1 is a system that controls wireless communication using, for example, Long Term Evolution (LTE) (registered trademark) as a communication system. The wireless communication control system 1 of the present example embodiment includes a base station device 10, a relay device 20, n (n is any natural number) wireless terminal devices 30-1 to 30-$n$, a server device 40, a mobile network 51, and an Internet network 52.

The wireless terminal devices 30-1 to 30-$n$ each are a mobile terminal device such as a smartphone and a tablet terminal. The base station device 10 accommodates the wireless terminal devices 30-1 to 30-$n$ and controls wireless communication for the wireless terminal devices 30-1 to 30-$n$. The base station device 10 may be a macrocell base station or a small cell base station. One or a plurality of frequency bandwidths used by the base station device 10 are applicable. The base station device 10 is connected to the mobile network 51 that is a communication network. The server device 40 executes various applications such as the Web and video reproduction in response to a request from the wireless terminal devices 30-1 to 30-$n$ and provides the execution result to the wireless terminal devices 30-1 to 30-$n$. The server device 40 is connected to the Internet network 52 that is a communication network. The relay device 20 is connected to the mobile network 51 and the Internet network 52 and relays traffic between the mobile network 51 and the Internet network 52. The numbers of the base station device 10, the relay device 20, and the server device 40 are not limited to the configuration illustrated in FIG. 1. Hereinafter, components included in the wireless communication control system 1 are described in detail.

Wireless Terminal Devices 30-1 to 30-$n$

The wireless terminal devices 30-1 to 30-$n$ according to the present example embodiment include a basic function of wireless transmission/reception for wireless communication with the base station device 10. The wireless terminal devices 30-1 to 30-$n$ include, as a basic function:
1) a function for transmitting a control signal and a data signal including a reference signal (e.g. a signal used for measuring quality of a communication path to the base station device 10 by the wireless terminal devices 30-1 to 30-$n$: hereinafter, similar for a reference signal) of an upstream line;

2) a function for receiving a control signal and a data signal including a reference signal of a downstream line from the base station device 10;

3) a function for measuring signal quality (wireless signal quality) of wireless communication with the base station device 10 during connection; and the like.

As an example of the wireless communication quality described above, there is a channel quality indicator (CQI) representing a specifier indicating reception quality of a downstream data signal for each physical resource block (PRB) that is a wireless resource or each group of PRBs. As an example of the wireless communication quality, alternatively, there are reference signal received power (RSRP) representing reception power of a downstream reference signal and reference signal received quality (RSRQ) representing reception quality of a downstream reference signal. RSRQ is defined as a ratio of RSRP to a received signal strength indicator (RSSI) in the same frequency bandwidth as a frequency bandwidth where RSRP is measured.

An RSSI includes reception power from a wireless terminal device located in a cell (a local cell) controlled by a certain base station and reception power from a cell (another cell) controlled by a wireless terminal device controlled by another base station in a periphery. The wireless terminal devices 30-1 to 30-$n$ are able to measure RSRP and RSRQ for a local cell and another cell. These functions included in the wireless terminal devices 30-1 to 30-$n$ are a well-known matter of those of ordinary skill in the art, and therefore detailed description of each function is omitted.

Relay Device 20

The relay device 20 according to the present example embodiment includes a setting unit 21. The setting unit 21 generates information (app information) relating to an application necessary for setting transmission priority of data for each application such as the Web and video reproduction being executed by the server device 40 in response to a request from the wireless terminal devices 30-1 to 30-$n$. The setting unit 21 sets, on the basis of the app information, a transmission end deadline (end limit) of IP packet data (hereinafter, referred to as a packet) for the wireless terminal devices 30-1 to 30-$n$ and reports the set deadline to the base station device 10.

A protocol defined in LTE or LTE Advanced corresponds to a protocol of layer 2 (data link layer) or lower in an Open Systems Interconnection (OSI) basis reference model. Therefore, a wireless communication control system using LTE performs communication between a wireless terminal device and a server device by using a protocol of layer 3 (network layer) or higher such as a transmission control protocol (TCP) in an OSI basis reference model but performs communication between a wireless terminal device and a base station device by using a protocol of layer 2 or lower. The relay device 20 relays communication using a protocol of layer 3 or higher, and thereby the wireless communication control system 1 according to the present example embodiment is able to generate accurate app information. Thereby, the base station device 10 is able to allocate a wireless resource by using a transmission end deadline based on accurate app information as described later.

Figure 2:
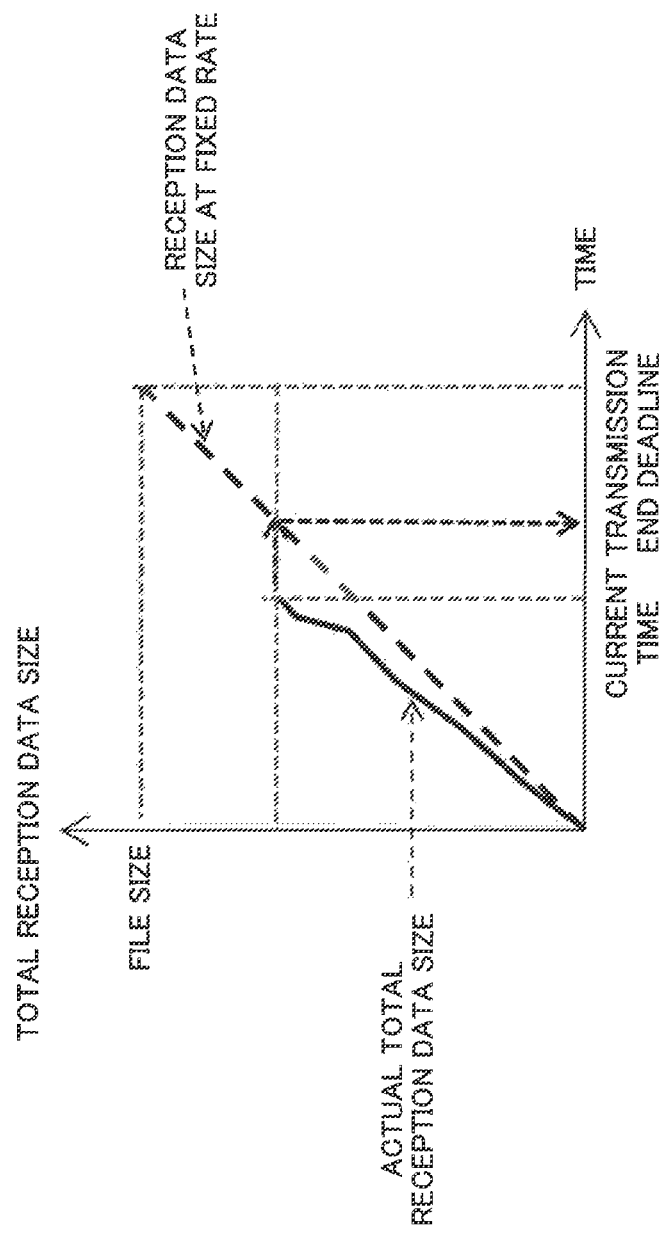
FIG. 2 is a diagram illustrating one example of a method for setting a transmission end deadline by a setting unit 21 according to the first example embodiment of the present invention.

Next, one example of a method for setting, by the setting unit 21 according to the present example embodiment, a transmission end deadline of a packet for the wireless terminal devices 30-1 to 30-$n$ is described by using FIG. 2.

The horizontal axis in a graph illustrated in FIG. 2 represents a time. The vertical axis represents a total reception data size already received by the wireless terminal devices 30-1 to 30-$n$ (a total size for each wireless terminal device of a packet for which the relay device 20 received an acknowledgement from each of the wireless terminal devices 30-1 to 30-$n$). The graph illustrated in FIG. 2 indicates time changes of an actual total reception data size and a total reception data size upon transmitting/receiving a packet at a fixed rate.

When an application executed in the server device 40 is, for example, the Web, a total reception data size represents a reception data size of a file configuring the Web. When an application executed in the server device 40 is, for example, video reproduction, a total reception data size represents a reception data size per chunk (data in a batch in a video). Further, a fixed rate represents a rate upon receiving the whole file in a predetermined period of time in the case of the Web and represents a reproduction rate in the case of video reproduction. The setting unit 21 according to the present example embodiment sets, as a transmission end deadline, a time for completing reception of data when data of a size equal to an actual total reception data size at a current time are received at a fixed rate, for example, as illustrated in FIG. 2. When a current time has exceeded the transmission end deadline, it is necessary for the base station device 10 to transmit data to the wireless terminal devices 30-1 to 30-$n$ at a rate equal to or more than the fixed rate in order to satisfy QoE. In this manner, the setting unit 21 sets, on the basis of app information, a transmission end deadline indicated by a value representing a traffic state occurring for each application executed by the server device 40 in response to a request from the wireless terminal devices 30-1 to 30-$n$.

The relay device 20 transfers the transmission end deadline set by the setting unit 21, by being included in a header of a corresponding packet, to the base station device 10 via the mobile network 51. A header of a packet is communication control information including an address of the packet and the like. However, it is assumed that the relay device 20 has information indicating a connection relation between each wireless terminal device and a base station device (or a correspondence of an IP address) and can identify a base station device to be a report destination of a transmission end deadline.

Base Station Device 10

The base station device 10 according to the present example embodiment allocates (schedules) a wireless resource (PRB) to each of the wireless terminal devices 30-1 to 30-$n$. With regard to allocation of a wireless resource, in general mobile communication represented by LTE or LTE Advanced, a base station device divides a bandwidth of a wireless frequency allocated into a plurality of PRBs and a scheduler included in the base station device allocates a PRB. The base station device 10 transmits/receives data to/from the wireless terminal devices 30-1 to 30-$n$ by using the allocated PRB.

The base station device 10 uses, when allocating a PRB that is a wireless resource, a CQI that is a specifier indicating wireless signal quality measured by the wireless terminal devices 30-1 to 30-$n$ for each PRB and reported to the base station device 10. The base station device 10 determines an allocation order for a wireless terminal device for each PRB on the basis of wireless signal quality in accordance with a scheduling rule.

As representative scheduling rules, the following four types are known.

Rule 1) Round robin: A PRB is allocated to a wireless terminal device in order, independently of wireless communication quality.

Rule 2) Minimum rate maximization: A PRB is allocated to a wireless terminal device in which an average communication rate in data transmission/reception from a predetermined time in a past to a time (t−1) is minimum.

Rule 3) Proportional Fairness (PF): A PRB is allocated to a wireless terminal device in which (an instantaneous communication rate at a time t)/(an average communication rate from a predetermined time in a past to a time (t−1)) is maximum (times t and (t−1) are described later). "/" is an operator representing division.

Rule 4) Max C/I: A PRB is allocated to a wireless terminal device in which an instantaneous communication rate at a time t is maximum.

In order from rule 4 to rule 1 described above, fairness among wireless terminal devices gradually increases, and inversely, in order from rule 1 to rule 4, frequency usage efficiency in the wireless communication control system 1 (a transmission bitrate per unit frequency) increases.

The base station device 10 includes a wireless transmission/reception unit 11, a wired transmission/reception unit 12, a calculation unit 13 (calculator), and an allocation unit 14 (allocator). Hereinafter, components included in the base station device 10 are described in detail.

Wireless Transmission/Reception Unit 11

The wireless transmission/reception unit 11 includes a basic function for wireless transmission/reception of a base station device in a general wireless communication system in wireless communication with the wireless terminal devices 30-1 to 30-n. The basic function includes, for example, the following functions:

1) a function of transmitting a control signal and a data signal including a reference signal of a downstream line;
2) a function of receiving a control signal and a data signal, including a reference signal of an upstream line, from the wireless terminal devices 30-1 to 30-n;
3) a scheduler function of selecting a wireless terminal device 30-i (i is any integer from 1 to n) to be a destination of data transmission of a downstream line and allocating a PRB, modulation and coding schemes (MCS), and the like to the wireless terminal device 30-i;
4) a signal processing function executed by a plurality of transmission/reception antenna elements;
5) a function of reporting a report condition of wireless signal quality of each cell (a coverage range of wireless communication controlled by the base station device 10) to each wireless terminal device; and
6) a buffer function of storing a transmission-waiting packet on each wireless terminal device.

The wireless transmission/reception unit 11 receives data addressed to the wireless terminal devices 30-1 to 30-n transmitted from the server device 40, via the wired transmission/reception unit 12. The wireless transmission/reception unit 11 stores the data received via the wired transmission/reception unit 12 on a buffer associated with each of the wireless terminal devices 30-1 to 30-n and transmits the stored data to the wireless terminal devices 30-1 to 30-n via a wireless line. The functions included in the wireless transmission/reception unit 11 are well-known matters to those of ordinary skill in the art, and therefore detailed description of the functions is omitted.

Wired Transmission/Reception Unit 12

The wired transmission/reception unit 12 includes a basic function for wired transmission/reception of a base station device in a general wireless communication system in wireless communication with the wireless terminal devices 30-1 to 30-n. The wired transmission/reception unit 12 receives data addressed to the wireless terminal devices 30-1 to 30-n from the server device 40, via the Internet network 52 and transmits data transmitted from the wireless terminal devices 30-1 to 30-n to the server device 40, via the Internet network 52. The function included in the wired transmission/reception unit 12 is a well-known matter to those of ordinary skill in the art, and therefore detailed description of the function of the wired transmission/reception unit 12 is omitted.

Calculation Unit 13

The calculation unit 13 acquires, for a packet received from the relay device 20 by the wired transmission/reception unit 12, information of a transmission end deadline included in a header thereof. The calculation unit 13 stores the transmission end deadline of the received packet for the wireless terminal devices 30-1 to 30-n accommodated in the base station device 10.

The calculation unit 13 calculates, by using, as a criterion, a packet having the shortest time by a transmission end deadline among acquired packets, a total size $S_p$ of packets ranging from a top packet to the packet to be a criterion stored on a buffer that stores transmission data to a wireless terminal device. The calculation unit 13 calculates $S_p$ for each of the wireless terminal devices 30-1 to 30-n.

The calculation unit 13 calculates a transmission start deadline (start limit) representing a time that is a deadline of starting transmission of a packet to be a criterion (a packet having the shortest transmission end deadline). The transmission end deadline is calculated, upon starting transmission of a packet to a wireless terminal device at a time after the deadline, as a time of a limit where it is difficult to complete transmission of the packet by a transmission end deadline. Specifically, the calculation unit 13 calculates a transmission start deadline, for example, by using equation 1.

$$t_{startlimit} = t_{endlimit} - (N_{HARQ} * T_{HARQ} + T_{UE} + T_{resource}) \quad \text{(Equation 1)}$$

In equation 1, "+", "−", and "*" are operators representing addition, subtraction, and multiplication in this order.

In equation 1, $t_{startlimit}$ represents a transmission start deadline and $t_{endlimit}$ represents a transmission end deadline. $N_{HARQ}$ represents an upper limit of the number of times of transmission of hybrid automatic repeat requests (HARQs). Specifically, the number of times of transmission completion of most HARQs is set as a criterion, and, for example, as the number of times of completion of 99.99% of HARQs, $N_{HARQ}$ is four times when a target value of an error rate of a scheduler for one transmission is set as 0.1. The transmission completion indicates that in the wireless terminal devices 30-1 to 30-n, reception of an HARQ has succeeded and an acknowledgement thereof has reached the base station device 10 without error. In equation 1, $T_{HARQ}$ represents a round trip time (RTT) of an HARQ. A typical value of $T_{HARQ}$ is regarded as 8 msec. As described above, a portion of "$N_{HARQ} * T_{HARQ}$" in equation 1 is a criterion value of a total resending delay time of data in wireless communication to the wireless terminal devices 30-1 to 30-$n$.

In equation 1, $T_{UE}$ represents a delay time in processing in the wireless terminal devices 30-1 to 30-$n$. Specifically, $T_{UE}$ includes a packet processing time, a transfer processing time of data to a higher-level layer, and the like. $T_{resource}$ represents a transmission time necessary for ensuring the number of PRBs necessary for transmitting data of a total size $S_p$ calculated by the calculation unit 13 and is calculated by using equation 2.

$$T_{resource} = (S_p/TBS_{perPRB})N_{Sys} \quad \text{(Equation 2)}$$

In equation 2, $TBS_{perPRB}$ represents the number of bits per PRB determined from wireless signal quality (CQI) reported at a predetermined most recent time. In LTE, MCS is determined on the basis of a reported CQI and a transport block size (TBS) corresponding to the MCS is determined. In equation 2, $N_{Sys}$ is the number of PRBs representing a system bandwidth. In the wireless communication control system 1 according to the present example embodiment, it is assumed that a wireless terminal device having passed a transmission start deadline is allocated with the whole system bandwidth per transmission time interval (TTI) at the maximum level. A numerator ($S_p$/TBS in equation 2 corresponds to perPRB) the number of necessary PRBs described above. When, for example, a value of the number of necessary PRBs is 100 and a system bandwidth is 50 PRBs (in the case of 10 MHz), $T_{resource}$ is 2 msec. $t_{startlimit}$ represented in equation 1 depends on $T_{UE}$ and $T_{resource}$ and is dynamically updated by the calculation unit 13. As described above, a portion of "$T_{UE} + T_{resource}$" in equation 1 is an estimation value of a transmission time necessary by transmission completion of data to the wireless terminal devices 30-1 to 30-$n$.

The calculation unit 13 calculates a value representing a highness of transmission priority to be a criterion upon allocating a wireless resource (PRB) to each of the wireless terminal devices 30-1 to 30-$n$ for each TTI. The allocation unit 14 to be described later allocates a PRB preferentially to a terminal device having a larger value of transmission priority when, as one example, it is indicated that as a value calculated by the calculation unit 13 is larger, priority is higher. The calculation unit 13 calculates a value (hereinafter, transmission priority P) representing a highness of transmission priority for each wireless terminal device, for example, by using equation 3.

$$P = P_{quality} + P_{time} \quad \text{(Equation 3)}$$

In equation 3, $P_{quality}$ is a value representing transmission priority calculated by using wireless signal quality. The calculation unit 13 calculates $P_{quality}$ by using equation 4 when, for example, rule 3 (PF) described above is used as a scheduling rule.

$$P_{quality} = \text{(an instantaneous communication rate at a time } t\text{)/(an average communication rate until a time } (t-1)) \quad \text{(Equation 4)}$$

In equation 4, a time t represents a current time (a time for calculating $P_{quality}$) and a time t−1 represents a time having a TTI one before an TTI of the time t. In equation 3, $P_{time}$ represents transmission priority calculated on the basis of a current time by the calculation unit 13.

Figure 3:
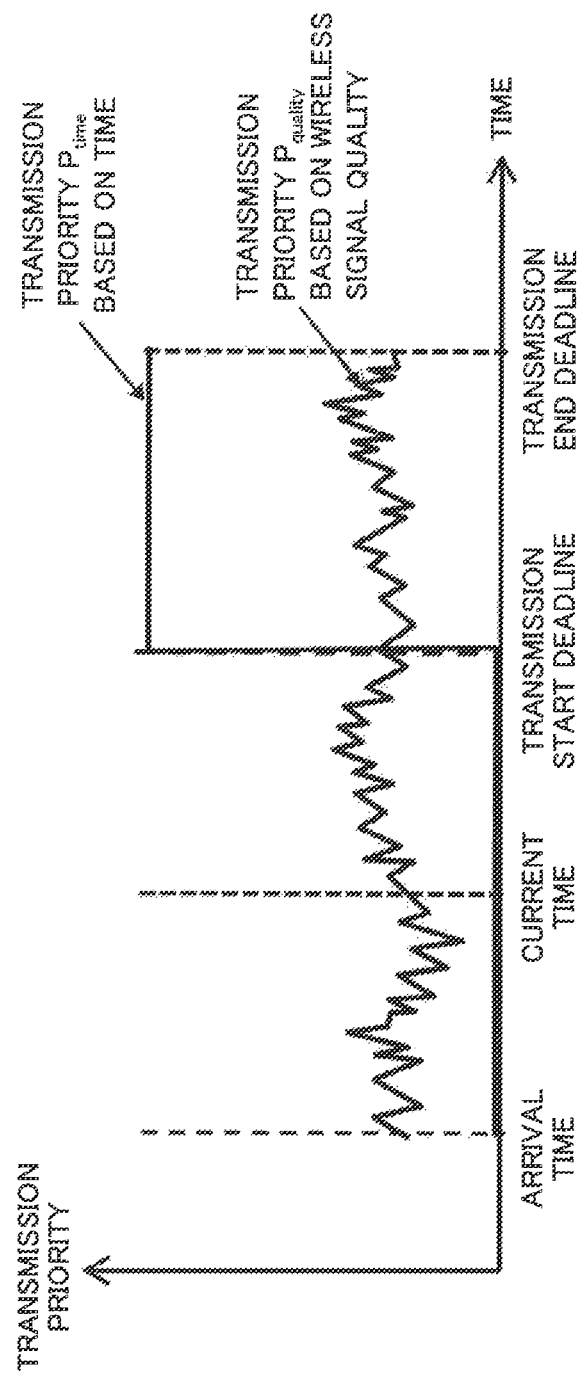
FIG. 3 is a diagram exemplarily illustrating a time change of transmission priority calculated by the wireless communication control system 1 according to the first example embodiment of the present invention.

FIG. 3 is a graph illustrating one example of a relation among a current time, a transmission start deadline, and a transmission end deadline in which an arrival time of a packet to be a criterion is designated as a start point and transmission priority $P_{time}$ for a time set dependently on these. In FIG. 3, for reference, transmission priority $P_{quality}$ based on wireless signal quality is illustrated together. When a current time falls within a period from an arrival time to a transmission start deadline, it is unnecessary for the base station device 10 to preferentially transmit a packet to a wireless terminal device, and therefore the calculation unit 13 calculates transmission priority $P_{time}$ as 0. On the other hand, when a current time exceeds a transmission start deadline (however, does not exceed a transmission end deadline), it is difficult to complete transmission by the transmission end deadline when transmission of a packet is not started, and therefore the calculation unit 13 calculates transmission priority $P_{time}$ as a value that is sufficiently larger than transmission priority $P_{quality}$ (a value in which an influence due to $P_{quality}$ is negligible). The calculation unit 13 reports the calculated transmission priority P for each wireless terminal device to the allocation unit 14.

Allocation Unit 14

The allocation unit 14 allocates a PRB to the wireless terminal devices 30-1 to 30-$n$ in accordance with transmission priority P reported from the calculation unit 13. In other words, the allocation unit 14 preferentially allocates a PRB to a wireless terminal device 30-$i$ (i is any integer from 1 to n) set with transmission priority P having a value sufficiently larger than $P_{quality}$ (i.e., a wireless terminal device that receives a packet in which a current time exceeds a transmission start deadline). At that time, the allocation unit 14 preferentially allocates PRBs for the number of PRBs necessary for transmission at one or more TTIs, as described for $T_{resource}$. After allocating a PRB to the wireless terminal device 30-$i$, the allocation unit 14 allocates, when there is a remaining PRB, the reclaiming PRB to a wireless terminal device except the wireless terminal device 30-$i$ on the basis of wireless signal quality, for example, by applying rule 3 (PF) described above as a scheduling rule.

Figure 4:
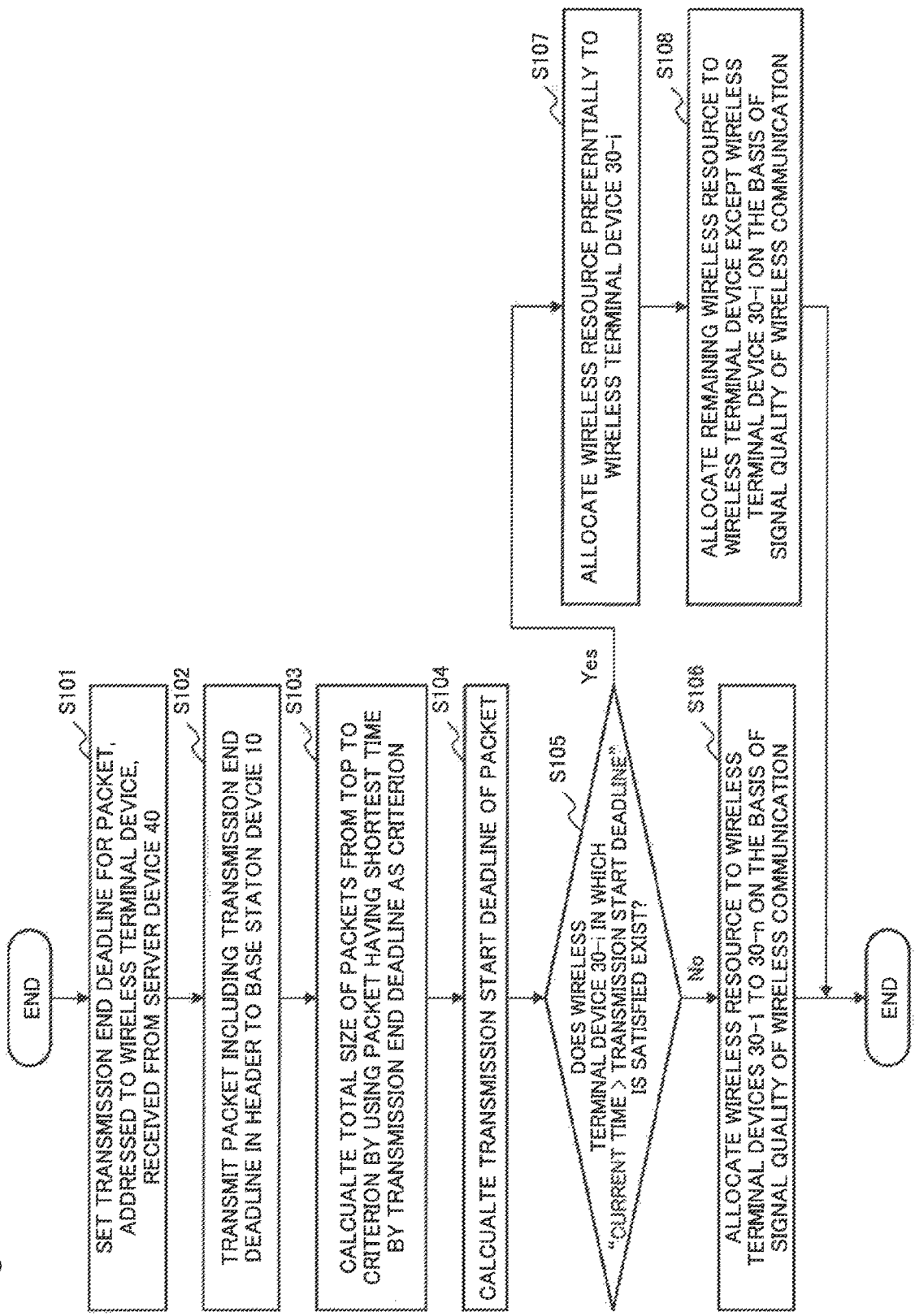
FIG. 4 is a flowchart illustrating an operation of the wireless communication control system 1 according to the first example embodiment of the present invention.

Next, with reference to a flowchart of FIG. 4, an operation (processing) of the wireless communication control system 1 according to the present example embodiment is described in detail.

The setting unit 21 in the relay device 20 sets a transmission end deadline $t_{endlimit}$ for a packet received from the server device 40 and addressed to at least any one of the wireless terminal devices 30-1 to 30-$n$ (step S101). The relay device 20 transmits a packet including the transmission end deadline in a header to the base station device 10 (step S102).

The calculation unit 13 in the base station device 10 calculates, by using a packet having the shortest time by the transmission end deadline as a criterion, a total size of packets from a top to the criterion (step S103). The calculation unit 13 calculates a transmission start deadline $t_{startlimit}$ of the packet, for example, on the basis of equation 1 described above (step S104).

When a wireless terminal device 30-$i$ (i is any integer from 1 to n) in which a current time exceeds a transmission start deadline does not exist (No in step S105), the allocation unit 14 in the base station device 10 allocates a wireless resource to the wireless terminal devices 30-1 to 30-$n$ on the basis of signal quality of wireless communication (step S106) and the entire processing ends.

When a wireless terminal device 30-$i$ in which a current time exceeds the transmission start deadline calculated in step S104 exists (Yes in step S105), the allocation unit 14 preferentially allocates a wireless resource to the specific wireless terminal device 30-I (step S107). The allocation unit 14 allocates a remaining wireless resource to a wireless terminal device except the specific wireless terminal device 30-*i* on the basis of signal quality of wireless communication (step S108) and the entire processing ends.

The wireless communication control system 1 according to the present example embodiment is able to improve quality of user experience in wireless communication. The reason is that the wireless communication control system 1 sets a transmission end deadline for data (a packet) transmitted from the server device 40 to the wireless terminal devices 30-1 to 30-*n*, calculates a transmission start deadline in such a way that transmission of the data can be completed by the transmission end deadline, and allocates a wireless resource on the basis of the transmission start deadline and a current time.

Hereinafter, an advantageous effect achieved by the wireless communication control system 1 according to the present example embodiment is described in detail.

In general, as a load on a communication network is higher, a ratio of users difficult to satisfy predetermined QoE tends to increase. In a base station device and the like in a wireless communication system, a general scheduler for allocating a wireless resource for performing communication with a wireless terminal device allocates a wireless resource on the basis of signal quality of wireless communication. In this case, a general scheduler does not allocate a wireless resource by considering a transmission completion time that satisfies predetermined QoE, and therefore there is a problem that it is difficult to avoid an increase in a ratio of users difficult to satisfy predetermined QoE.

For such a problem, in the wireless communication control system 1 according to the present example embodiment, the setting unit 21 in the relay device 20 sets, for data transmitted, by an application executed by the server device 40 in response to a request from the wireless terminal devices 30-1 to 30-*n*, to these wireless terminal devices, a transmission end deadline for the wireless terminal devices on the basis of information of the application. The calculation unit 13 in the base station device 10 calculates a transmission start deadline of data for a wireless terminal device in such a way that transmission of the data is completed by the transmission end deadline. The allocation unit 14 in the base station device 10 allocates a wireless resource necessary for transmitting data to a wireless terminal device on the basis of the transmission start deadline and a current time. Thereby, the wireless communication control system 1 according to the present example embodiment is able to increase users who satisfy predetermined QoE.

Further, in the wireless communication control system 1 according to the present example embodiment, the allocation unit 14 allocates a wireless resource based on a transmission start deadline and a current time and also allocates a wireless resource based on signal quality of wireless communication. Thereby, the wireless communication control system 1 according to the present example embodiment is able to increase users who satisfy predetermined QoE without decreasing frequency usage efficiency of a wireless bandwidth.

Further, while the calculation unit 13 according to the present example embodiment described above calculated, by using a target value of an error rate, an upper limit $N_{HARQ}$ of the number of times of transmission of HARQs by using the number of times of transmission completion of most (99.99%) HARQs as a criterion, the calculation unit 13 may calculate $N_{HARQ}$ by a method different therefrom. The calculation unit 13 may calculate $N_{HARQ}$ in such a way as to be a transmission completion ratio (e.g. 99.99%) to be achieved, for example, on the basis of a past result of ACKnowledge (ACK)/Negative ACK (NACK) of transmission or may calculate $N_{HARQ}$ on the basis of a transmission result of a specific application, a wireless terminal device, and the like.

Further, the calculation unit 13 according to the present example embodiment calculates transmission priority $P_{time}$ as a value that rapidly increases (increases in a rectangular manner) with respect to a time, by setting a transmission start deadline as a trigger as illustrated in FIG. 3. However, the calculation unit 13 may calculate $P_{time}$ that takes a value moderately increasing linearly with respect to a time or increasing in an exponential-function-like non-linear manner, for example, before and after a transmission start deadline (in a period including a transmission start deadline). Further, the calculation unit 13 may set, when a plurality of applications that exceed a transmission start deadline are mixed, a maximum value of transmission priority $P_{time}$ in order to provide priority for these applications, dependently on an application.

Further, the calculation unit 13 according to the present example embodiment may be assumed to allocate all PRBs to one wireless terminal device at one time, may be assumed to allocate some PRBs, or may be assumed to equally allocate a PRB to a plurality of wireless terminal devices when calculating $T_{resource}$ represented in equation 2 described above.

Further, while the setting unit 21 according to the present example embodiment described above sets a transmission end deadline by using, as a criterion, a total reception data size upon receiving packets at a fixed rate as illustrated in FIG. 2, the setting unit 21 may set a transmission end deadline by using, as a criterion, a total reception data size upon receiving packets at a rate that dynamically changes. The setting unit 21 may set a transmission end deadline by using, as a criterion, a total reception data size upon receiving packets at an exponential-function-like rate, for example, in such a way as to be connected with a slow start of TCP executed in order to avoid congestion.

Further, the allocation unit 14 according to the present example embodiment may select data to be allocated with a wireless resource according to an execution state of an application executed in the server device 40. When in the server device 40, for example, an application executed in the background and an application executed in the foreground are mixed, the allocation unit 14 first regards data, output by the foreground application, necessary to be allocated with a wireless resource at real time as an allocation target of a wireless resource. The wireless communication control system 1 may allocate a wireless resource to data output by the background application after communication for the foreground application ends. In this case, for example, the relay device 20 identifies whether to be foreground or background. The setting unit 21 in the relay device 20 sets a transmission end deadline of the background application as a value longer than a transmission end deadline of the foreground application.

Further, in the wireless communication control system 1 according to the present example embodiment described above, while the relay device 20 includes the setting unit 21, a device other than the relay device 20 includes a configuration corresponding to the setting unit 21. When, for example, the base station device 10 includes a configuration corresponding to the setting unit 21, the base station device 10 may include a deep packet inspection (DPI) function, thereby execute DPI for data addressed to the wireless terminal device 30-1 to 30-*n* received from the server device 40, identify applications, and set a transmission end deadline for each application. Further, the base station device 10 may include a mobile edge computing (MEC) function and thereby set a transmission end deadline. Alternatively, the server device 40 may include a configuration corresponding to the setting unit 21.

Further, in the wireless communication control system 1 according to the present example embodiment described above, while the relay device 20 reports information indicating a set transmission end deadline to the base station device 10 by including the information in a header of an IP packet, the relay device 20 may report, by a method different therefrom, information indicating a transmission end deadline to the base station device 10. The wireless communication control system 1 may include, for example, a dedicated interface between the relay device 20 and the base station device 10. In this case, the relay device 20 generates a dedicated packet for reporting information indicating a transmission end deadline and reports a transmission end deadline to the base station device 10 via the dedicated interface.

Further, in the description of the first example embodiment described above, it is assumed that the relay device 20 and the base station device 10 are synchronized for signal processing of communication control, but the relay device 20 and the base station device 10 may not be synchronized. In this case, a synchronous relationship (time difference) between the relay device 20 and the base station device 10 in signal processing of communication control is previously measured, and the relay device 20 sets a transmission end deadline based on the synchronous relationship.

Further, in the wireless communication control system 1 according to the present example embodiment described above, while a transmission delay time of a signal between the relay device 20 and the base station device 10 is neglected, actually, for example, a transmission delay time of several tens msec may occur, depending on a congestion degree of a line, a physical configuration of a line, and the like. In this case, the setting unit 21 may set a transmission end deadline by considering a transmission delay time. In this case, for example, the setting unit 21 previously measures a transmission delay time by using a ping command or the like and thereby sets a transmission end deadline based on the transmission delay time.

Further, individual wireless terminal devices according to the present example embodiment may receive in parallel data of a plurality of application being executed in parallel by the server device 40. In this case, the wireless communication control system 1 sets a transmission start deadline and transmission priority, for example, by using, as a criterion, an application for data having the shortest time by a transmission end deadline among the plurality of applications.

A wireless communication system targeted by the wireless communication control system 1 according to the present example embodiment is not limited to the LTE system. A wireless communication system targeted by the wireless communication control system 1 may be, for example, the Universal Mobile Telecommunications System (UMTS) that is a communication system before LTE or the Frequency Division Duplex (FDD) system simultaneously using different frequencies in an upstream line and a downstream line. Alternatively, the wireless communication control system 1 according to the present example embodiment is also applicable to a wireless communication system (e.g. WiFi (registered trademark), WiMAX (registered trademark), IEEE 802.16m) employing the Time Division Duplex (TDD) system using the same frequency in an upstream line and a downstream line at different times. IEEE is an abbreviation of "The Institute of Electrical and Electronics Engineers, Inc".

Second Example Embodiment

Next, a wireless communication control system 1A according to a second example embodiment of the present invention is described. The wireless communication control system 1A according to the present example embodiment includes, as illustrated in FIG. 1, a base station device 10A, a relay device 20, n (n is any natural number) wireless terminal devices 30-1 to 30-n, a server device 40, a mobile network 51, and an Internet network 52. A configuration except the base station device 10A of the wireless communication control system 1A according to the present example embodiment is similar to the wireless communication control system 1 according to the first example embodiment, and therefore description thereof is omitted.

The base station device 10A according to the present example embodiment includes, as illustrated in FIG. 1, a wireless transmission/reception unit 11, a wired transmission/reception unit 12, a calculation unit 13A, and an allocation unit 14. A configuration except the calculation unit 13A of the base station device 10A according to the present example embodiment is similar to the base station device 10 according to the first example embodiment, and therefore description thereof is omitted.

The calculation unit 13A according to the second example embodiment is different from the calculation unit 13 according to the first example embodiment in a calculation method for a transmission start deadline. In other words, the calculation unit 13A according to the present example embodiment calculates an average rate on the basis of an allocation result of a wireless resource in a predetermined period nearest a current time. The calculation unit 13A calculates an estimated time $T_{estimate}$ upon assuming that a packet is transmitted at the calculated average rate and calculates a transmission start deadline $t_{startlimit}$.

The calculation unit 13A in the present example embodiment calculates, by using equation 5, a transmission start deadline by using a transmission end deadline as a criterion.

$$t_{starttime} = t_{endlimit} - (N_{HARQ} * T_{HARQ} + T_{UE} + T_{estimate}) \quad \text{(Equation 5)}$$

In equation 5, $T_{resource}$ in equation 1 used by the calculation unit 13 according to the first example embodiment is replaced with $T_{estimate}$.

The calculation unit 13A calculates an estimated time $T_{estimate}$ by using equation 6.

$$T_{estimate} = S_p/(S_{TBS}/T) \quad \text{(Equation 6)}$$

In equation 6, T represents a predetermined period (e.g. 10TTI) nearest a current time, and $S_{TBS}$ represents a total value of the number of transmission bits (TBS) of PRBs allocated based on wireless signal quality to the wireless terminal devices 30-1 to 30-n in a period T. At that time, an average rate based on an allocation result of a wireless resource is $(S_{TBS}/T)$ that is a denominator of the right side of equation 6. In other words, an estimated time $T_{estimate}$ is determined, by using, as a criterion, a packet having the shortest time by a transmission end deadline, via division of a total size $S_p$ of packets from a top to the criterion by an average rate.

When the number of recent allocation results of wireless resources is small, an average rate that is the denominator of the right side of equation 6 decreases and thereby an estimated time $T_{estimate}$ increases, and therefore a transmission start deadline $t_{startlimit}$ is short as represented in equation 5. Further, when a total size $S_p$ that is the numerator of the right side of equation 6 is large, an estimated time $T_{estimate}$ increases, and therefore a transmission start time $t_{startlimit}$ is short similarly. The calculation unit 13A updates an estimated time $T_{estimate}$ with a cycle of a TTI.

The wireless communication control system 1A according to the present example embodiment is able to improve quality of user experience in wireless communication. The reason is as described for the first example embodiment. Further, the wireless communication control system 1A according to the present example embodiment calculates a transmission start deadline by using an estimated time considering recent allocation results of a wireless resource and a size of data to be transmitted, and therefore allocates a wireless resource appropriate for an actual scheduling situation of a wireless resource and thereby is able to further heighten the effect of improving quality of user experience.

Third Example Embodiment

Next, a wireless communication control system 1B according to a third example embodiment of the present invention is described. The wireless communication control system 1B according to the present example embodiment includes, as illustrated in FIG. 1, a base station device 10B, a relay device 20, n (n is any natural number) wireless terminal devices 30-1 to 30-n, a server device 40, a mobile network 51, and an Internet network 52. A configuration except the base station device 10B of the wireless communication control system 1B according to the present example embodiment is similar to the wireless communication control system 1 according to the first example embodiment, and therefore description thereof is omitted.

The base station device 10B according to the present example embodiment includes, as illustrated in FIG. 1, a wireless transmission/reception unit 11, a wired transmission/reception unit 12, a calculation unit 13B, and an allocation unit 14B. A configuration except the calculation unit 13B and the allocation unit 14B of the base station device 10B according to the present example embodiment is similar to the base station device 10 according to the first example embodiment, and therefore description thereof is omitted.

The wireless communication control system 1B according to the present example embodiment allocates, when a plurality of wireless terminal devices in which a current time has passed a transmission start deadline exist, a wireless resource to these wireless terminal devices. Further, the wireless communication control system 1B allocates a wireless resource on the basis of a transmission end deadline in addition to a transmission start deadline.

The calculation unit 13B according to the present example embodiment determines whether a wireless terminal device in which a current time has passed a transmission end deadline exists among the wireless terminal devices 30-1 to 30-n accommodated in the base station device 10B. The calculation unit 13B reports the determination result to the allocation unit 14B.

The allocation unit 14B according to the present example embodiment discards, for a wireless terminal device 30-j (j is at least any integer from 1 to n) in which a current time has passed a transmission end deadline, a packet having passed the transmission end deadline and excludes the wireless terminal device 30-j from allocation targets of a wireless resource. The reason is that even when a wireless resource for transmitting a packet having already passed a transmission end deadline is allocated, it is difficult to maintain QoE.

The allocation unit 14B allocates PRBs for the number of PRBs necessary for transmission to a wireless terminal device 30-i (i is at least any integer from 1 to n except j) in which a current time has passed a transmission start deadline, in ascending order of a value indicated by (a transmission end deadline—a current time). The reason is that as a wireless terminal device has a smaller value indicated by (a transmission end deadline—a current time), an elapsed time from passage of a transmission start deadline is longer, and therefore it is conceivable that it is necessary to immediately allocate a wireless resource to the wireless terminal device.

Figure 5:
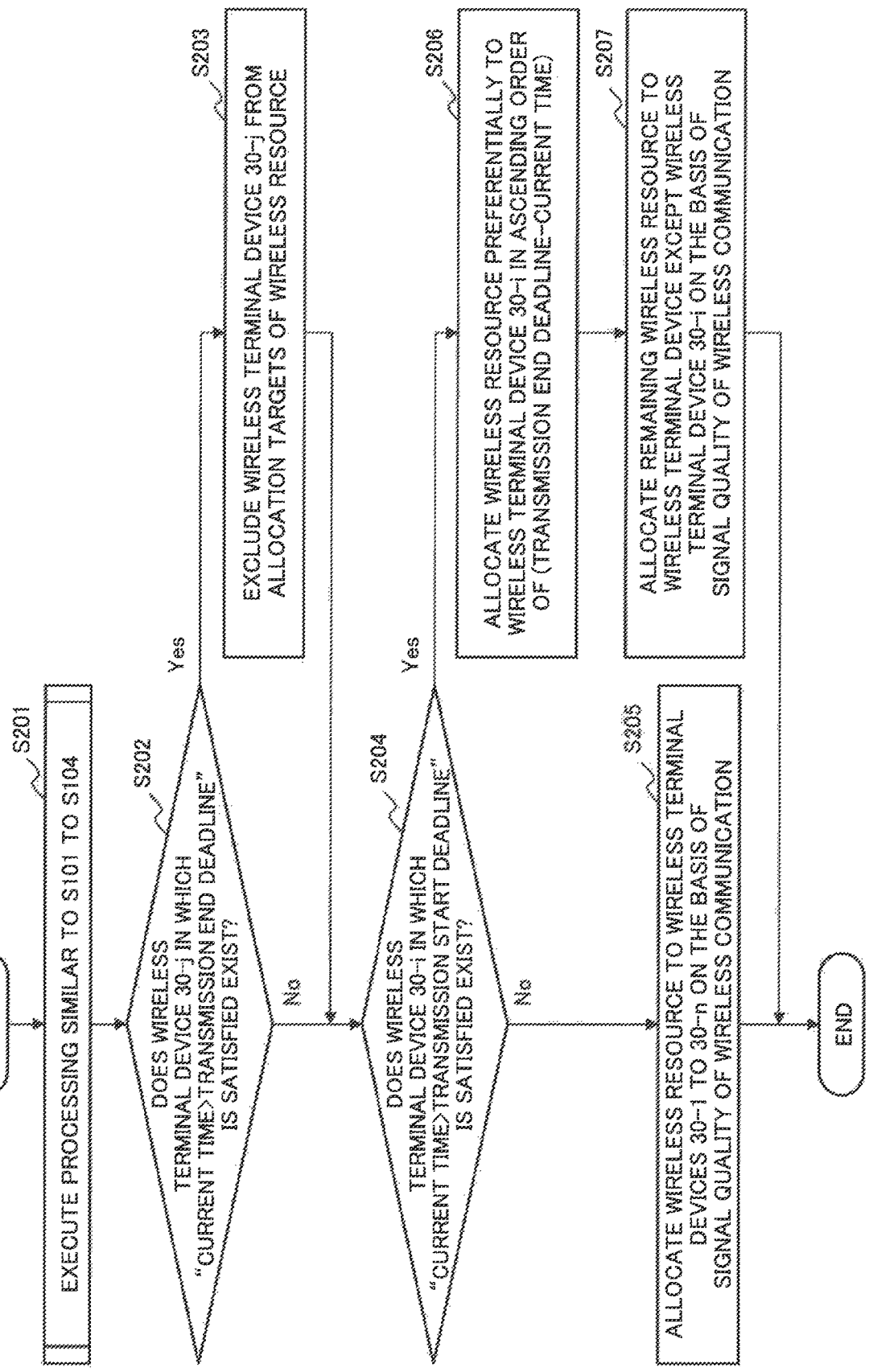
FIG. 5 is a flowchart illustrating an operation of a wireless communication control system 1B according to a third example embodiment of the present invention.

Next, with reference to a flowchart illustrated in FIG. 5, an operation (processing) of the wireless communication control system 1B according to the present example embodiment is described in detail.

The wireless communication control system 1B execute processing similar to steps S101 to S104 (step S201). When a wireless terminal device 30-j (j is at least any integer from 1 to n) in which a current time has passed a transmission end deadline exists (Yes in step S202), the allocation unit 14B excludes the specific wireless terminal device 30-j from allocation targets of a wireless resource (step S203). When a wireless terminal device 30-j in which a current time has passed a transmission end deadline does not exist (No in step S202), processing moves to step S204.

When a wireless terminal device 30-i (i is at least any integer from 1 to n except j) in which a current time has passed a transmission start deadline does not exist (No in step S204), the allocation unit 14B allocates a wireless resource to the wireless terminal devices 30-1 to 30-n (however, except the wireless terminal device 30-j) (step S205) on the basis of signal quality of wireless communication (step S205), and the entire processing ends.

When a wireless terminal device 30-i in which a current time has passed a transmission start deadline exists (Yes in step S204), the allocation unit 14B allocates a wireless resource to the specific wireless terminal device 30-i preferentially in ascending order of (a transmission end deadline—a current time) (step S206). The allocation unit 14B allocates a remaining wireless resource to wireless terminal devices (however, except the wireless terminal device 30-j) except the wireless terminal device 30-i on the basis of signal quality of wireless communication (step S207), and the entire processing ends.

The wireless communication control system 1B according to the present example embodiment is able to improve quality of user experience in wireless communication. The reason is as described for the first example embodiment. Further, the wireless communication control system 1B according to the present example embodiment discards a packet having passed a transmission end deadline and also allocates wireless resources for a necessary number to a terminal device having passed a transmission start deadline in order from a terminal device having higher urgency. Thereby, the wireless communication control system 1B according to the present example embodiment efficiently allocates a wireless resource and thereby is able to further improve an effect of improving quality of user experience.

Further, the calculation unit 13B according to the present example embodiment may determine whether, for example, a wireless terminal device in which a current time has passed a transmission end deadline and also a total size of packets to be transmitted is equal to or more than a predetermined value exists or not. In this case, the allocation unit 14B is able to discard a packet only when possibility of transmission completion is small even when a certain extension of a period from a transmission end deadline is set.

Further, the allocation unit 14B according to the present example embodiment may switch (corresponding to a handover function in LTE), for example, a first base station device that accommodates a wireless terminal device 30-j to a second base station device having room for a wireless resource, instead of excluding the wireless terminal device 30-j from allocation targets of a wireless resource in step S203. In this case, the wireless communication control system 1B may measure, for example, a usage rate of PRBs in a predetermined period and determine that a base station device therefor has room for a wireless resource when the usage rate is equal to or less than a predetermined threshold.

Further, while allocating a wireless resource to a wireless terminal device 30-i in ascending order of a value indicated by (a transmission end deadline—a current time) in step S206, in contrast, the allocation unit 14B according to the present example embodiment may allocate a wireless resource in descending order of a value indicated by (a transmission end deadline—a current time). In this case, the wireless communication control system 1B executes allocation control of a wireless resource in accordance with a policy that as a wireless terminal device has a shorter elapsed time from passage of a transmission start deadline, possibility of transmission completion by a transmission end deadline is higher depending on allocation of a wireless resource.

Fourth Example Embodiment

Figure 6:
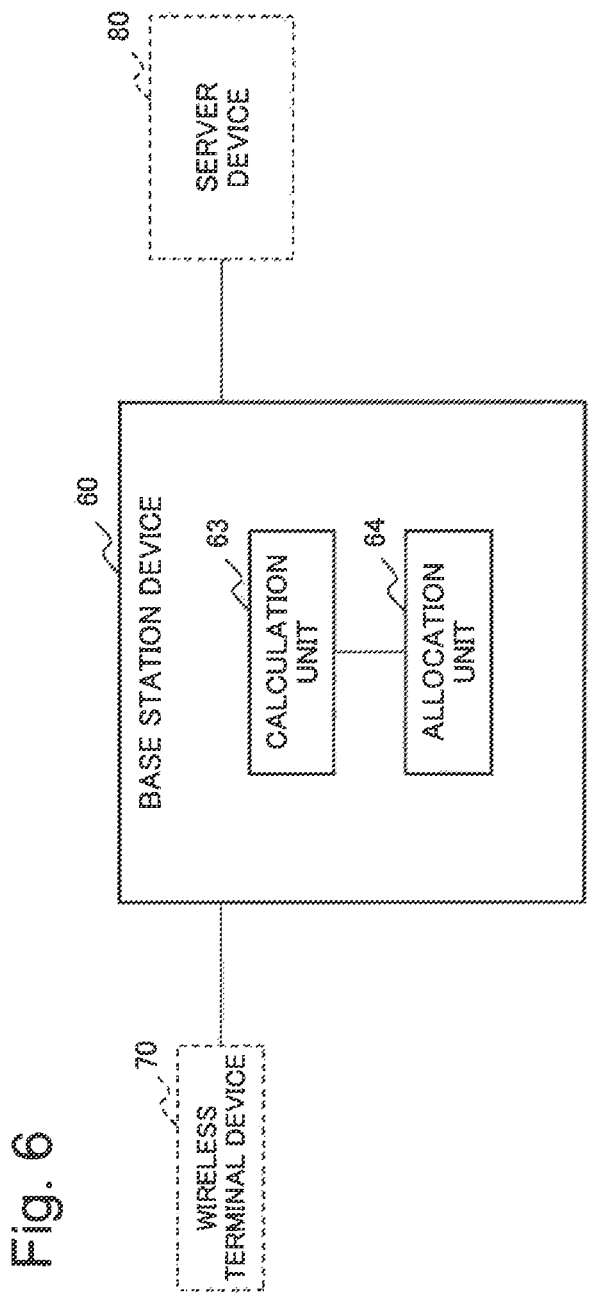
FIG. 6 is a block diagram illustrating a configuration of a base station device 60 according to a fourth example embodiment of the present invention.

FIG. 6 is a block diagram conceptually illustrating a configuration of a base station device 60 according to a fourth example embodiment of the present invention.

The base station device 60 according to the present example embodiment includes a calculation unit 63 and an allocation unit 64.

The calculation unit 63 calculates, when data transmitted to a wireless terminal device 70 by an application executed by a server device 80 in response to a request from the wireless terminal device 70 are transmitted to the wireless terminal device 70 by using a wireless resource, a transmission start deadline of the data in such a way that transmission of the data to the wireless terminal device 70 can be completed by a transmission end deadline for the wireless terminal device 70. However, it is assumed that the transmission end deadline is previously set on the basis of information of the application.

The allocation unit 64 allocates a wireless resource necessary for transmitting the data to the wireless terminal device 70 on the basis of the transmission start deadline and a current time.

The base station device 60 according to the present example embodiment is able to improve quality of user experience in wireless communication. The reason is that the base station device 60 calculates a transmission start deadline in such a way that by a transmission end deadline set for data transmitted from the server device 80 to the wireless terminal device 70, transmission of the data can be completed and allocates a wireless resource on the basis of the transmission start deadline and a current time.

Hardware Configuration Example

Units in the base station devices 10 (10A, 10B) and 60 and the relay device 20 illustrated in FIGS. 1 and 6 in the example embodiments described above can be achieved by dedicated hardware (HW) (electronic circuit). Further, in FIGS. 1 and 6, it is conceivable that at least the following components each are a function (processing) unit (software module) of a software program.

The setting unit 21
The calculation units 13, 13A, 13B, and 63
The allocation units 14, 14B, and 64

However, division of units illustrated in these drawings is a configuration for convenience of description, and upon implementation, various configurations are assumable. One example of a hardware environment in this case is described with reference to FIG. 7.

Figure 7:
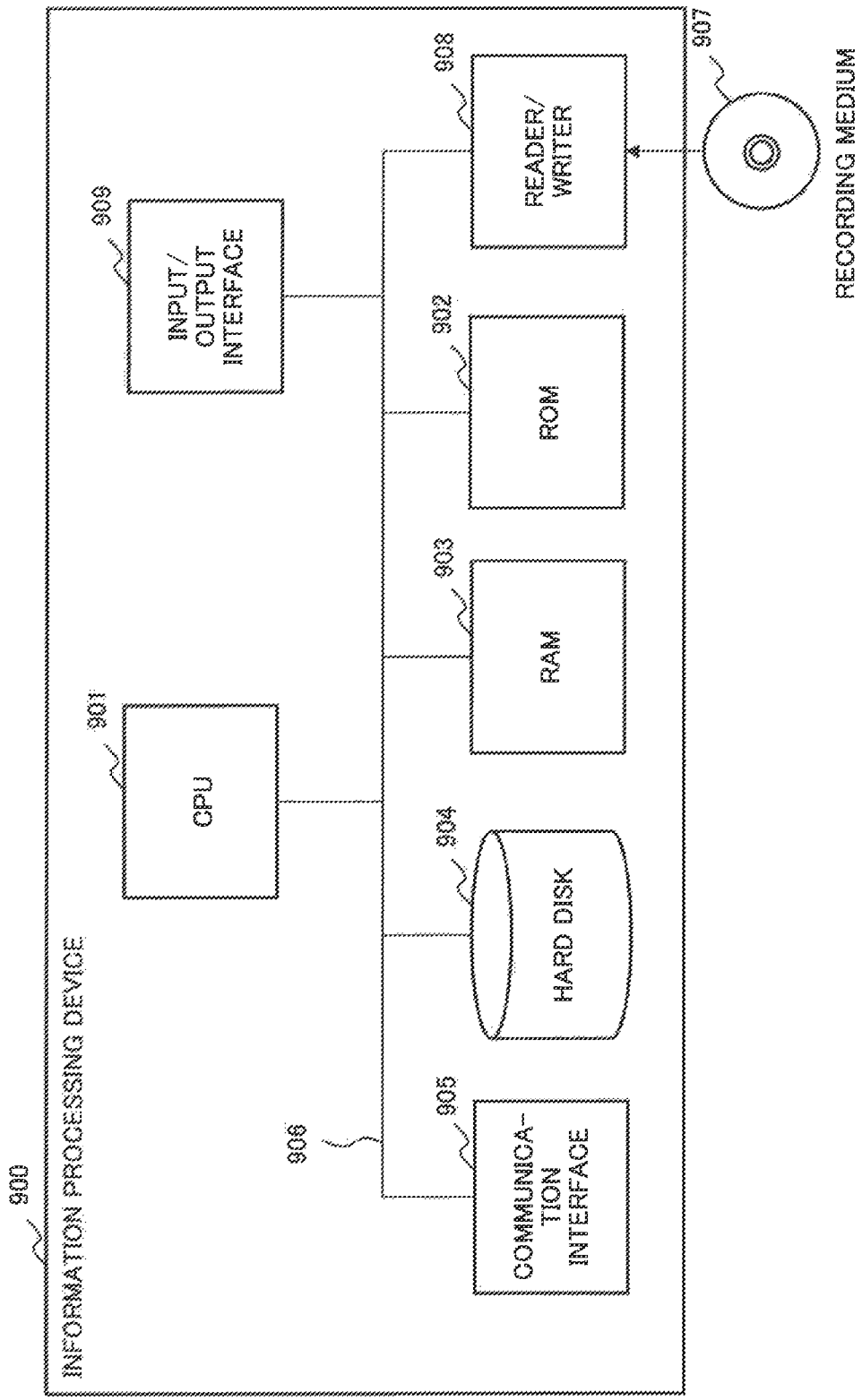
FIG. 7 is a block diagram illustrating a configuration of an information processing device 900 capable of running a base station device according to example embodiments of the present invention.

FIG. 7 is a diagram exemplarily illustrating a configuration of an information processing device 900 (computer) capable of running a base station device according to the example embodiments of the present invention. In other words, FIG. 7 represents a configuration of a computer (information processing device) capable of achieving a base station device or a part thereof illustrated in FIGS. 1 and 6 and a hardware environment capable of achieving functions in the example embodiments describe above. The information processing device 900 illustrated in FIG. 7 includes, as components thereof, the following:

A central processing unit (CPU) 901,
A read only memory (ROM) 902,
A random access memory (RAM) 903,
A hard disk (storage device) 904,
A communication interface 905 with an external device such as a wireless transmission/reception unit.
A bus 906 (communication line),
A reader/writer 908 capable of reading/writing data stored on a recording medium 907 such as a compact disc read only memory (CD-ROM), and
An input/output interface 909.

In other words, the information processing device 900 including the components is a general computer connected with a configuration thereof via the bus 906. The information processing device 900 may include a plurality of CPUs 901 or may include the CPU 901 including a multicore.

The present invention described by using the example embodiments described above as examples supplies a computer program capable of achieving the following function to the information processing device 900 described in FIG. 7. The function refers to a function of the above-described configuration in a block configuration diagram (FIGS. 1 and 6) or a flowchart (FIGS. 4 and 5) referred to in the description of the example embodiments. The present invention is achieved thereafter by reading the computer program on the CPU 901 of the hardware and interpreting and executing the program. The computer program supplied into the device may be stored on a readable/writable transitory memory (RAM 903) or a non-transitory storage device such as the ROM 902 and the hard disk 904.

Further, in the above-described case, as a method for supplying a computer program into the hardware, currently, a general procedure is employable. The procedure includes, for example, a method for installation into the device via various types of recording media 907 such as a CD-ROM and a method for download from an outside via a communication line such as the Internet. In such cases, it is conceivable that the present invention includes a code configuring the computer program or the recording medium 907 that stores the code.

Further, some functions of a setting unit, a calculation unit, and an allocation unit according to the example embodiments described above may be achieved in order by first to third information processing devices 900.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

A part or the whole of the example embodiments described above may be described as the following supplementary notes. However, the present invention illustratively described by the example embodiments described above is not limited to the following.

Supplementary Note 1

A base station device including:
when the data, which are transmitted to a wireless terminal device by an application executed by a server device in response to a request from the wireless terminal device, are transmitted to the wireless terminal device by using a wireless resource, a calculation means that calculates a transmission start deadline of data that enables to complete transmission of the data to the wireless terminal device by a transmission end deadline for the wireless terminal device, the transmission end deadline being set on the basis of information about the application; and
an allocation means that allocates the wireless resource necessary for transmitting the data to the wireless terminal device on the basis of the transmission start deadline and a current time.

Supplementary Note 2

The base station device according to supplementary note 1, wherein
the calculation means calculates the transmission start deadline by using the transmission end deadline as a criterion on the basis of a criterion value of a total resending delay time of the data in wireless communication for the wireless terminal device, and an estimation value of a transmission time necessary for completing transmission of the data.

Supplementary Note 3

The base station device according to supplementary note 2, wherein
the calculation means calculates the criterion value of the total resending delay time by using an RTT and a criterion value of a number of times of transmission based on a target value or a result value relation to a ratio that the transmission succeeds or fails, with respect to an HARQ for the data.

Supplementary Note 4

The base station device according to supplementary note 2, wherein the calculation means determines a size of the wireless resource necessary for transmitting the data by using a size of the data and a communicable size determined on the basis of signal quality of the wireless communication, and calculates a time necessary for ensuring the wireless resource whose size is determined, as the estimation value of the transmission time.

Supplementary Note 5

The base station device according to supplementary note 2, wherein
the calculation means determines an average communication rate upon transmission of the data on the basis of an allocation result of the wireless resource allocated on the basis of signal quality of the wireless communication at a predetermined time until the current time, and calculates the estimation value of the transmission time based on the determined average communication rate and a size of the data.

Supplementary Note 6

The base station device according to any one of supplementary notes 1 to 5, wherein
the allocation means allocates, among a plurality of the wireless terminal devices, the wireless resource to a first of the wireless terminal device where a current time has passed the transmission start deadline in preference to a second of the wireless terminal device where the current time has not passed the transmission start deadline.

Supplementary Note 7

The base station device according to supplementary note 6, wherein
priority upon allocating, by the allocation means, the wireless resource to the wireless terminal device takes a value that increases in a rectangular manner with respect to a time at a timing that the current time has passed the transmission start deadline, or a value that increases linearly or nonlinearly with respect to a time in a period including a transmission start deadline.

Supplementary Note 8

The base station device according to supplementary note 6, wherein
priority upon allocating, by the allocation means, the wireless resource to the wireless terminal device takes a value depending on the application transmitting the data.

Supplementary Note 9

The base station device according to supplementary note 6, wherein
the allocation means allocates the wireless resource to the first wireless terminal device and thereafter allocates a remaining part of the wireless resource to the second wireless terminal device.

Supplementary Note 10

The base station device according to any one of supplementary notes 1 to 9, wherein
the allocation means allocates the wireless resource, among a plurality of the wireless terminal devices, preferentially to the wireless terminal device having a smaller difference between the transmission end deadline and the current time, or preferentially to the wireless terminal device having a larger difference between the transmission end deadline and the current time.

Supplementary Note 11

The base station device according to any one of supplementary notes 1 to 10, wherein
the allocation means excludes the wireless terminal device that receives the data whose transmission end deadline is passed by the current time from allocation targets of a wireless resource, and discards the data whose transmission end deadline is passed by the current time.

Supplementary Note 12

The base station device according to any one of supplementary notes 1 to 10, wherein
the allocation means excludes, from allocation targets of a wireless resource, the wireless terminal device that receives the data whose transmission end deadline is passed by the current time and total size is equal to or more than a predetermined value, and discards the data whose transmission end deadline is passed by the current time and total size is equal to or more than the predetermined value.

Supplementary Note 13

The base station device according to any one of supplementary notes 1 to 12, wherein
the allocation means selects the data to be allocated with the wireless resource according to an execution state of the application in the server device.

Supplementary Note 14

A wireless communication control system including:
a relay device including a setting means that sets the transmission end deadline for the wireless terminal device on the basis of information about the application, and reports the set transmission end deadline; and
the base station device according to any one of supplementary notes 1 to 13.

Supplementary Note 15

The wireless communication control system according to supplementary note 14, wherein
the setting means sets the transmission end deadline on the basis of the information about the application indicated by a value of traffic for each of the application.

Supplementary Note 16

The wireless communication control system according to supplementary note 14 or 15, wherein
the setting means sets the transmission end deadline by using, as a criterion, a total reception data size upon receiving the data at a fixed rate or a dynamically changing rate.

Supplementary Note 17

The wireless communication control system according to any one of supplementary notes 14 to 16, further including
a first and a second of the base station devices, wherein
the allocation means controls the first base station device that accommodates the wireless terminal device that receives the data whose transmission end deadline is passed by the current time, to be switched to the second base station device.

Supplementary Note 18

The wireless communication control system according to any one of supplementary notes 14 to 17, wherein
the setting means reports the transmission end deadline to the calculation means as header information of a packet included in the data or as information included in a dedicated packet transmitted/received by a dedicated interface communicably connecting the base station device and the relay device.

Supplementary Note 19

The wireless communication control system according to any one of supplementary notes 14 to 18, wherein
the setting means sets the transmission end deadline on the basis of a synchronous relationship for signal processing of communication control between the relay device and the base station device.

Supplementary Note 20

The wireless communication control system according to any one of supplementary notes 14 to 19, wherein
the setting means sets the transmission end deadline on the basis of a transmission delay time of a signal between the relay device and the base station device.

Supplementary Note 21

A base station device including:
a setting means that sets a transmission end deadline for a wireless terminal device on the basis of information about an application executed by a server device in response to a request from the wireless terminal device, when data transmitted to the wireless terminal device by the application are transmitted to the wireless terminal device by using a wireless resource;
a calculation means that calculates a transmission start deadline of the data in such a way that transmission of the data to the wireless terminal device is able to be completed by the transmission end deadline; and
an allocation means that allocates the wireless resource necessary for transmitting the data to the wireless terminal device on the basis of the transmission start deadline and a current time.

Supplementary Note 22

A wireless communication control method including controlling a base station device to:
set,
by a first information processing device,
a transmission end deadline for a wireless terminal device on the basis of information about an application executed by a server device in response to a request from the wireless terminal device, when data transmitted to the wireless terminal device by the application are transmitted to the wireless terminal device by using a wireless resource;
calculate,
by a second information processing device,
a transmission start deadline of the data in such a way that transmission of the data to the wireless terminal device is able to be completed by the transmission end deadline; and
allocate,
by a third information processing device,
the wireless resource necessary for transmitting the data to the wireless terminal device on the basis of the transmission start deadline and a current time.

Supplementary Note 23

A recording medium storing a base station control program that causes a computer to execute:

when the data, which are transmitted to a wireless terminal device by an application executed by a server device in response to a request from the wireless terminal device, are transmitted to the wireless terminal device by using a wireless resource, calculation processing of calculating a transmission start deadline of data that enables to complete transmission of the data to the wireless terminal device by a transmission end deadline for the wireless terminal device, the transmission end deadline being set on the basis of information about the application; and allocation processing of allocating the wireless resource necessary for transmitting the data to the wireless terminal device on the basis of the transmission start deadline and a current time.

REFERENCE SIGNS LIST

1 Wireless communication control system
1A Wireless communication control system
1B Wireless communication control system
10 Base station device
10A Base station device
10B Base station device
11 Wireless transmission/reception unit
12 Wired transmission/reception unit
13 Calculation unit
13A Calculation unit
13B Calculation unit
14 Allocation unit
14B Allocation unit
20 Relay device
21 Setting unit
30-1 to 30-n Wireless terminal device
40 Server device
51 Mobile network
52 Internet network
60 Base station device
63 Calculation unit
64 Allocation unit
70 Wireless terminal device
80 Server device
900 Information processing device
901 CPU
902 ROM
903 RAM
904 Hard disk (storage device)
905 Communication interface
906 Bus
907 Recording medium
908 Reader/writer
909 Input/output interface

The invention claimed is:
1. A base station device comprising:
a processor;
memory storing executable instructions that, when executed by the processor, causes the processor to perform as an allocator and a calculator;
when data, which are transmitted to a wireless terminal device by an application executed by a server device in response to a request from the wireless terminal device, are transmitted to the wireless terminal device by using a wireless resource, the calculator configured to calculate a transmission start deadline of data that enables to complete transmission of the data to the wireless terminal device by a transmission end deadline for the wireless terminal device, the transmission end deadline being set based on information about the application; and
the allocator is configured to allocate the wireless resource necessary for transmitting the data to the wireless terminal device, based on the transmission start deadline and a current time, wherein
the calculator calculates the transmission start deadline by using the transmission end deadline as a criterion, based on a criterion value of a total resending delay time of the data in wireless communication for the wireless terminal device, and an estimation value of a transmission time necessary for completing transmission of the data, and
the calculator does one of a first processing, a second processing, and a third processing,
the first processing calculating the criterion value of the total resending delay time by using an RTT (Round Trip Time) and a criterion value of a number of times of transmission based on a target value or a result value relation to a ratio that the transmission succeeds or fails, with respect to an HARQ (Hybrid Automatic Repeat Request) for the data,
the second processing determining a size of the wireless resource necessary for transmitting the data by using a size of the data and a communicable size determined based on signal quality of the wireless communication, and calculating a time necessary for ensuring the wireless resource whose size is determined, as the estimation value of the transmission time, and
the third processing determining an average communication rate upon transmission of the data, based on an allocation result of the wireless resource allocated based on signal quality of the wireless communication at a predetermined time until the current time, and calculating the estimation value of the transmission time based on the determined average communication rate and a size of the data.

2. The base station device according to claim 1, wherein the allocator allocates, among a plurality of the wireless terminal devices, the wireless resource to a first of the wireless terminal device where a current time has passed the transmission start deadline in preference to a second of the wireless terminal device where the current time has not passed the transmission start deadline.

3. The base station device according to claim 2, wherein priority upon allocating, by the allocator, the wireless resource to the wireless terminal device takes a value that increases in a rectangular manner with respect to a time at a timing that the current time has passed the transmission start deadline, or a value that increases linearly or nonlinearly with respect to a time in a period including a transmission start deadline.

4. The base station device according to claim 2, wherein priority upon allocating, by the allocator, the wireless resource to the wireless terminal device takes a value depending on the application transmitting the data.

5. The base station device according to claim 2, wherein the allocator allocates the wireless resource to the first wireless terminal device, and thereafter allocates a remaining part of the wireless resource to the second wireless terminal device.

6. The base station device according to claim 1, wherein the allocator excludes the wireless terminal device that receives the data whose transmission end deadline is passed by the current time from allocation targets of a wireless resource, and discards the data whose transmission end deadline is passed by the current time.

7. The base station device according to claim 1, wherein the allocator excludes, from allocation targets of a wireless resource, the wireless terminal device that receives the data whose transmission end deadline is passed by the current time and total size is equal to or more than a predetermined value, and discards the data whose transmission end deadline is passed by the current time and total size is equal to or more than the predetermined value.

8. The base station device according to claim 1, wherein the allocator selects the data to be allocated with the wireless resource according to an execution state of the application in the server device.

9. The base station device according to claim 1, wherein the allocator allocates the wireless resource, among a plurality of the wireless terminal devices, preferentially to the wireless terminal device having a smaller difference between the transmission end deadline and the current time, or preferentially to the wireless terminal device having a larger difference between the transmission end deadline and the current time.

10. A wireless communication control method comprising controlling a base station device to:

set, by a first information processing device, a transmission end deadline for a wireless terminal device, based on information about an application executed by a server device in response to a request from the wireless terminal device, when data transmitted to the wireless terminal device by the application are transmitted to the wireless terminal device by using a wireless resource;

calculate, by a second information processing device, a transmission start deadline of the data in such a way that transmission of the data to the wireless terminal device is able to be completed by the transmission end deadline, wherein the second information processing device calculates the transmission start deadline by using the transmission end deadline as a criterion, based on a criterion value of a total resending delay time of the data in wireless communication for the wireless terminal device, and an estimation value of a transmission time necessary for completing transmission of the data, and does one of a first processing, a second processing, and a third processing, the first processing calculating the criterion value of the total resending delay time by using an RTT (Round Trip Time) and a criterion value of a number of times of transmission based on a target value or a result value relation to a ratio that the transmission succeeds or fails, with respect to an HARQ (Hybrid Automatic Repeat Request) for the data, the second processing determining a size of the wireless resource necessary for transmitting the data by using a size of the data and a communicable size determined based on signal quality of the wireless communication, and calculating a time necessary for ensuring the wireless resource whose size is determined, as the estimation value of the transmission time, and the third processing determining an average communication rate upon transmission of the data, based on an allocation result of the wireless resource allocated based on signal quality of the wireless communication at a predetermined time until the current time, and calculating the estimation value of the transmission time based on the determined average communication rate and a size of the data; and allocate, by a third information processing device, the wireless resource necessary for transmitting the data to the wireless terminal device, based on the transmission start deadline and a current time.

11. A non-transitory computer-readable recording medium storing a base station control program that causes a computer to execute:

when data, which are transmitted to a wireless terminal device by an application executed by a server device in response to a request from the wireless terminal device, are transmitted to the wireless terminal device by using a wireless resource, calculation processing of calculating a transmission start deadline of data that enables to complete transmission of the data to the wireless terminal device by a transmission end deadline for the wireless terminal device, the transmission end deadline being set based on information about the application; and allocation processing of allocating the wireless resource necessary for transmitting the data to the wireless terminal device, based on the transmission start deadline and a current time, wherein the calculation processing calculates the transmission start deadline by using the transmission end deadline as a criterion, based on a criterion value of a total resending delay time of the data in wireless communication for the wireless terminal device, and an estimation value of a transmission time necessary for completing transmission of the data, and the calculation processing does one of a first processing, a second processing, and a third processing, the first processing calculating the criterion value of the total resending delay time by using an RTT (Round Trip Time) and a criterion value of a number of times of transmission based on a target value or a result value relation to a ratio that the transmission succeeds or fails, with respect to an HARQ (Hybrid Automatic Repeat Request) for the data, the second processing determining a size of the wireless resource necessary for transmitting the data by using a size of the data and a communicable size determined based on signal quality of the wireless communication, and calculating a time necessary for ensuring the wireless resource whose size is determined, as the estimation value of the transmission time, and the third processing determining an average communication rate upon transmission of the data, based on an allocation result of the wireless resource allocated based on signal quality of the wireless communication at a predetermined time until the current time, and calculating the estimation value of the transmission time based on the determined average communication rate and a size of the data.

* * * * *